United States Patent
Thrift et al.

(10) Patent No.: US 6,188,985 B1
(45) Date of Patent: Feb. 13, 2001

(54) WIRELESS VOICE-ACTIVATED DEVICE FOR CONTROL OF A PROCESSOR-BASED HOST SYSTEM

(75) Inventors: Philip R. Thrift, Dallas; Charles T. Hemphill, Allen, both of TX (US)

(73) Assignee: Texas Instruments Incorporated, Dallas, TX (US)

(*) Notice: Under 35 U.S.C. 154(b), the term of this patent shall be extended for 0 days.

(21) Appl. No.: 08/943,795

(22) Filed: Oct. 3, 1997

Related U.S. Application Data

(60) Provisional application No. 60/034,685, filed on Jan. 6, 1997.

(51) Int. Cl.[7] ............................. G10L 15/00; H04N 5/44
(52) U.S. Cl. ............................................ 704/275; 348/734
(58) Field of Search ................................. 704/275, 270; 348/734, 738

(56) References Cited

U.S. PATENT DOCUMENTS

| | | | | |
|---|---|---|---|---|
| 4,661,659 | * | 4/1987 | Nishimura | 455/462 |
| 5,199,080 | * | 3/1993 | Kimura et al. | 381/110 |
| 5,247,580 | * | 9/1993 | Kimura et al. | 704/275 |
| 5,636,211 | * | 6/1997 | Newlin et al. | 370/465 |
| 5,737,491 | * | 4/1998 | Allen et al. | 704/270 |
| 5,774,628 | * | 6/1998 | Hemphill | 704/255 |
| 5,796,394 | * | 8/1998 | Wicks et al. | 345/329 |
| 5,802,526 | * | 9/1998 | Fawcett et al. | 707/104 |
| 5,890,122 | * | 3/1999 | Van Kleeck et al. | 704/275 |
| 5,890,123 | * | 3/1999 | Brown et al. | 704/275 |
| 6,075,575 | * | 6/2000 | Schein et al. | 348/734 |

OTHER PUBLICATIONS

Holmes "Speech Synthesis and Recognition" Chapman Hill, p. 109, 1988.*
Ballou "Handbook for Sound Engineers" Howard Sams, p. 376, 1987.*
Dragon "Dragon Dictate 1.0 for Windows" Dragon systems, pp. 140, 13.*

* cited by examiner

Primary Examiner—David R. Hudspeth
Assistant Examiner—Harold Zintel
(74) Attorney, Agent, or Firm—Robert L. Troike; Frederick J. Telecky, Jr.

(57) ABSTRACT

A hand-held wireless voice-activated device (10) for controlling a host system (11), such as a computer connected to the World Wide Web. The device (10) has a display (10a), a microphone (10b), and a wireless transmitter (10g) and receiver (10h). It may also have a processor (10e) and memory (10f) for performing voice recognition. A device (20) can be specifically designed for Web browsing, by having a processor (20e) and memory (20f) that perform both voice recognition and interpretation of results of the voice recognition.

18 Claims, 3 Drawing Sheets

WIRELESS VOICE-ACTIVATED DEVICE FOR CONTROL OF A PROCESSOR-BASED HOST SYSTEM

This application claims benefit of Ser. No. 60/034,685 filed Jan. 6, 1997.

TECHNICAL FIELD OF THE INVENTION

The present invention relates generally to voice recognition devices, and more particularly to a wireless voice-controlled device that permits a user to browse a hypermedia network, such as the World Wide Web, with voice commands.

RELATED PATENT APPLICATIONS

This patent application is related to the following patent applications, each assigned to Texas Instruments Incorporated.

U.S. patent U.S. Pat. No. 5,774,628 entitled "Speaker-Independent Dynamic Vocabulary and Grammar in Speech Recognition"

U.S. patent application Ser. No. 08/419,229, entitled "Voice Activated Hypermedia Systems Using Grammatical Metadata"

BACKGROUND OF THE INVENTION

The Internet is a world-wide computer network, or more accurately, a world-wide network of networks. It provides an exchange of information and offers a vast range of services. Today, the Internet has grown so as to include all kinds of institutions, businesses, and even individuals at their homes.

The World-Wide Web ("WWW" or "Web") is one of the services available on the Internet. It is based on a technology known as "hypertext", in which a document has links to its other parts or to other documents. Hypertext has been extended so as to encompass links to any kind of information that can be stored on a computer, including images and sound. For example, using the Web, from within a document one can select highlighted words or phases to get definitions, sources, or related documents, stored anywhere in the world. For this reason, the Web may be described as a "hypermedia" network.

The basic unit in the Web is a "page", a (usually) text-plus-graphics document with links to other pages. "Navigating" the Web primarily means moving around from page to page.

The idea behind the Web is to collect all kinds of data from all kinds of sources, avoiding the problems of incompatibilities by allowing a smart server and a smart client program to deal with the format of the data. This capability to negotiate formats enables the Web to accept all kinds of data, including multimedia formats, once the proper translation code is added to the servers and clients. The Web client is used to connect to and to use Web resources located on Web servers.

One type of client software used to access and use the Web is referred as "web browser" software. This software can be installed on the user's computer to provide a graphic interface, where links are highlighted or otherwise marked for easy selection with a mouse or other pointing device.

SUMMARY OF THE INVENTION

One aspect of the invention is a wireless voice-activated control unit for controlling a processor-based host system, such as a computer connected to the World Wide Web. A compact hand-held unit has a microphone, a wireless audio input transmitter, a wireless data receiver, and a display. The microphone receives voice input from a user, thereby providing an audio input signal. The audio transmitter wirelessly transmits data derived from the audio signal to the host system. After the host acts on the audio input, it delivers some sort of response in the form of image data wirelessly delivered to the receiver. A display generates and displays images represented by the image data.

Variations of the device can include a speaker for audio output information. The device can also have a processor and memory for performing front-end voice recognition processes or even all of the voice recognition.

An advantage of the invention is that it makes information on the Web more accessible and useful. Speech control brings added flexibility and power to the Web interface and makes access to information more natural.

DETAILED DESCRIPTION OF THE INVENTION

The invention described herein is directed to a wireless voice-activated device for controlling a processor-based host system. That is, the device is a voice-activated remote control device. In the example of this description, the host system is a computer connected to the World-Wide Web and the device is used for voice-controlled web browsing. However, the same concepts can be applied to a voice-controlled device for controlling any processor-based system that provides display or audio information, for example, a television.

Various embodiments of the device differ with regard to the "intelligence" embedded in the device. For purposes of the invention, the programming used to recognize an audio input and to interpret the audio input so that it can be used by conventional web browser software is modularized in a manner that permits the extent of embedded programming to become a matter of design and cost.

Figure 1:
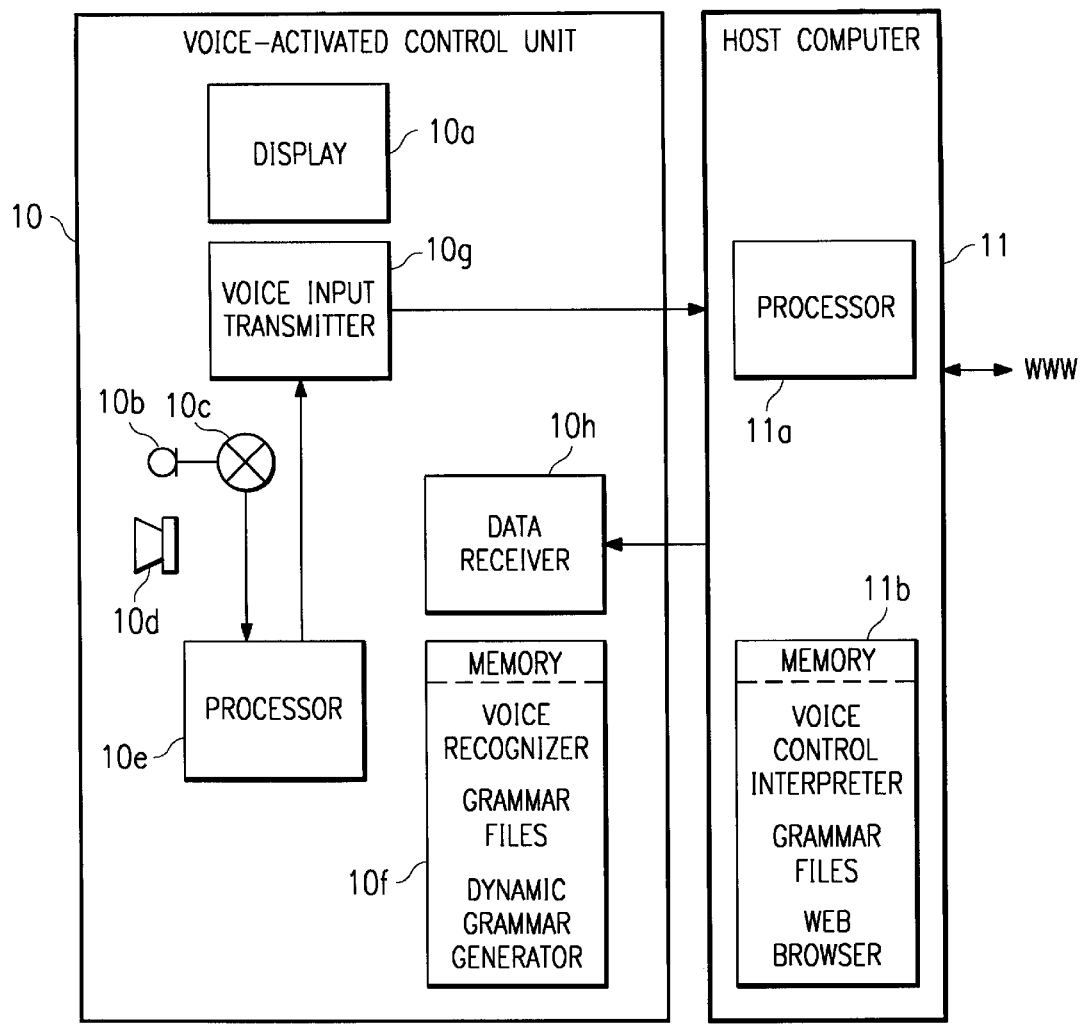
FIG. 1 illustrates one embodiment of a wireless voice-activated control unit in accordance with the invention.

FIG. 1 illustrates one embodiment of a wireless voice-activated control unit 10 in accordance with the invention. It communicates with a host system 11. As stated above, for purposes of this description, host system 11 is a computer and is in data communication with the World-Wide Web.

Control unit 10 has a display 10a and a microphone 10b. Display 10a is designed for compactness and portability, and could be an LCD. Microphone 10b receives voice input from a user. It may have a "mute" switch 10c, so that control unit 10 can be on, displaying images and even receiving non-audio input via an alternative input device such as a keypad (not shown), but not performing voice recognition. Microphone 10b may be a microphone array, to enhance the ability to differentiate the user's voice from other sounds.

In the embodiment of FIG. 1, control unit 10 performs all or part of the voice recognition process and delivers speech data to host computer 11 via transmitter 10g. Host computer 11 performs various voice control interpretation processes and also executes a web browser. However, in its simplest form control unit would transmit audio data directly from microphone 10b to host system 11, which would perform all processing.

In the case where control unit 10 performs all or part of the voice recognition process, control unit 10 has a processor 10e. Memory 10f stores voice recognition programming to be executed by processor 10e. An example of a suitable processor 10a for speech recognition is a signal processor, such as those manufactured by Texas Instruments Incorporated. Where microphone 10b is a microphone array, processor 10a may perform calculations for targeting the user's voice.

If control unit performs only some voice processing, it may perform one or more of the "front end" processes, such as linear predictive coding (LPC) analysis or speech end pointing.

If control unit 10 performs all voice recognition processes, memory 10f stores these processes (as a voice recognizer) as well as grammar files. In operation, the voice recognizer receives audio input from microphone 10b, and accesses the appropriate grammar file. A grammar file handler converts the grammar to speech-ready form, creating a punctuation grammar, and loading the grammar into the voice recognizer. The voice recognizer uses the grammar file to convert the audio input to a text translation.

The grammar files in memory 10f may be pre-defined and stored or may be dynamically created or may be a combination of both types of grammar files. An example of dynamic grammar file creation is described below in connection with FIG. 5. The grammars may be written with the Backus-Naur form of context-free grammars and can be customized. In the embodiment of FIG. 1, and where unit 10 is used for Web browsing, host computer 11 delivers the HTML (hyertext markup language) for a currently displayed Web page to unit 10. Memory 10f stores a grammar file generator for dynamically generating the grammar. In alternative Web browsing embodiments, host 11 could dynamically generate the grammar and download the grammar file to control unit 10.

The output of the voice recognizer is speech data. The speech data is transmitted to host system 11, which performs voice control interpretation processes. Various voice control interpretation processes for voice-controlled Web browsing are described in U.S. patent application Ser. No. 08/419,229, entitled "Voice Activated Hypermedia Systems Using Grammatical Metadata", assigned to Texas Instruments Incorporated and are incorporated herein by reference. As a result of the interpretation, the host system 11 may respond to the voice input to control unit 10 by executing a command or providing a hypermedia (Web) link.

An example of voice control interpretation other than for Web browsing is for commands to a television, where host system 11 is a processor-based television system. For example, the vocal command, "What's on TV tonight?", would result in a display of the television schedule. Another example of voice control interpretation other than for Web browsing is for commands for computer-based household control. The vocal command, "Show me the sprinkler schedule" would result in an appropriate display.

After host system 11 has taken the appropriate action, a wireless receiver 10h receives data from host system 11 for display on display 10a or for output by speaker 10d. Thus, the data received from host system 11 may be graphical (including text, graphics, images, and videos or audio.

Figure 2:
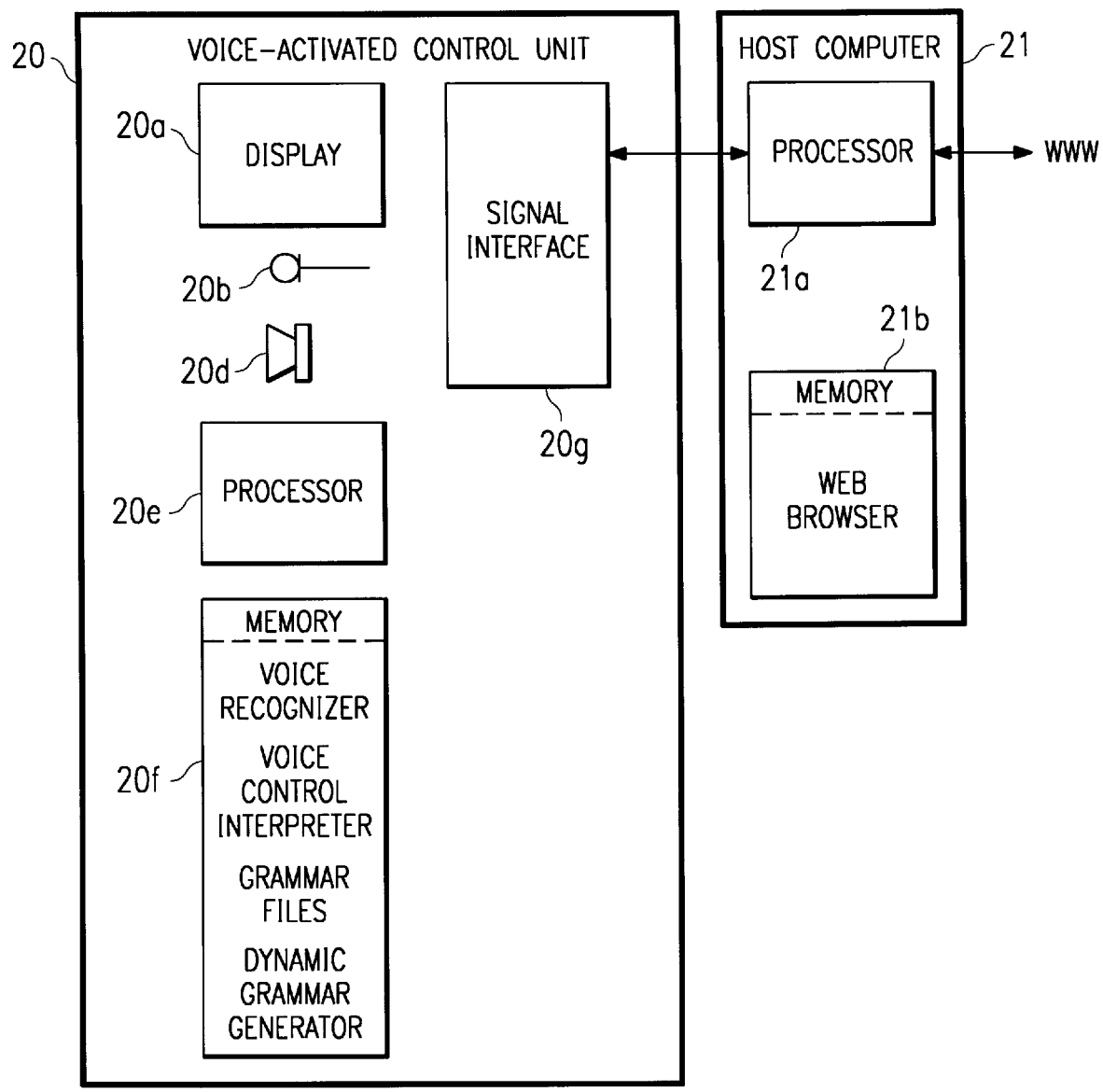
FIG. 2 illustrates another embodiment of a wireless voice-activated control unit, specially configured for translating and interpreting audio input from the user.

FIG. 2 illustrates an alternative embodiment of the invention, a wireless voice-activated control unit 20 that performs voice control interpretation as well as voice recognition. The voice control interpretation is specific to browsing a hypermedia resource, such as the Web. The host system 21 is connected to the hypermedia resource.

Control unit 20 has components similar to those of control unit 10. However, its processor 20e performs additional programming stored in memory 20f. Specifically, the voice control interpretation processes may comprise a speakable command process, a speakable hotlist process, or a speakable links process. These processes and their associated grammar files reside on control unit 20.

The speakable command process displays a command interface on display 20a and accepts various Web browsing commands. The process has an associated grammar file for the words and phrases that may be spoken by the user.

Figure 3:
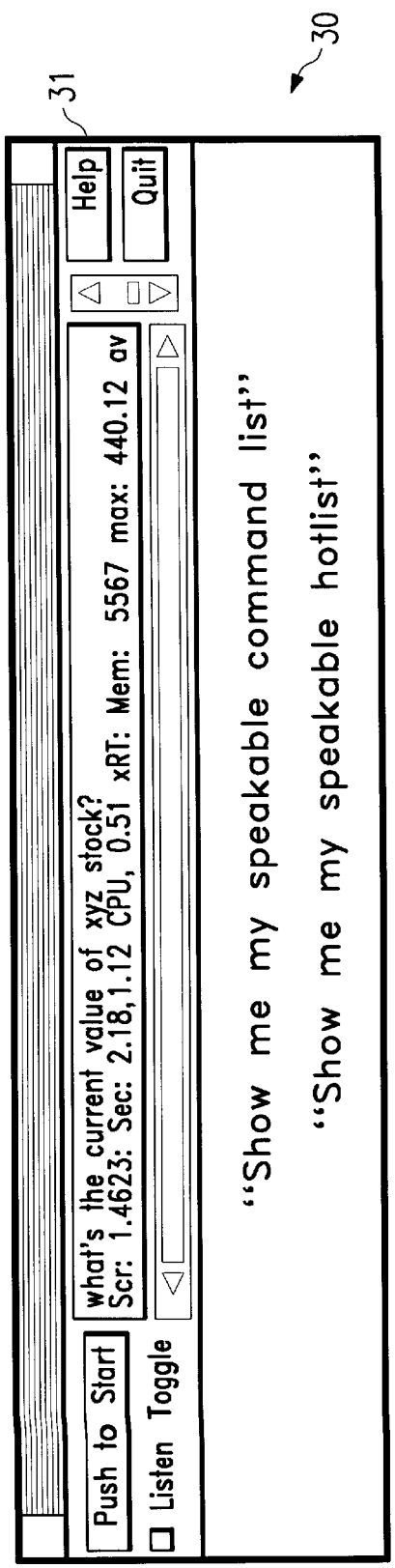
FIG. 3 illustrates an example of a display provided by the speakable command process.

FIG. 3 illustrates an example of a display 30 provided by the voice control interpretation process. One speakable command is a "Help" command, activated with a button 31. In response, the command process displays a "help page" that describes how to use voice-controlled browsing.

Another speakable command is, "Show me my speakable command list". Speaking this command displays a page listing a set of grammars, each representing a speakable command. Examples are pagedown_command, back_command, and help_command. When the command process receives a translation of one of these commands, it performs the appropriate action.

FIG. 3 also illustrates a feature of the voice recognizer that is especially useful for Web browsing. The user has spoken the words, "What is the value of XYZ stock?" Once the voice recognizer recognizes an utterance, it determines the score and various statistics for time and memory use. As explained below, the request for a stock value can be a hotlist item, permitting the user to simply voice the request without identifying the Web site where the information is located.

Another speakable command is "Show me my speakable hotlist", activated by button 33. A "hotlist" is a stored list of selected Uniform Resource Locators (URLS), such as those that are frequently used. Hotlists are also known as bookmarks. URLs are a well known feature of the Web, and provide a short and consistent way to name any resource on the Internet. A typical URL has the following form:

http://www.ncsa.uiic.edu/General/NCSAHome.html

The various parts of the URL identify the transmission protocol, the computer address, and a directory path at that address. URLs are also known as "links" and "anchors".

The speakable hotlist process permits the user to construct a grammar for each hotlist item and to associate the grammar with a URL. To create the grammar, the user can edit an ASCII grammar file and type in the grammar using the BNF syntax. For example, a grammar for retrieving weather information might define phrases such as, "How does the weather look today?" and "Give me the weather". The user then associates the appropriate URL with the grammar.

The hotlist grammar file can be modified by voice. For example, a current page can be added as a hotlist item. Speaking the phrase, "Add this page to my hotlist" adds the title of the page to the grammar and associates that grammar with the current URL. Speaking the phrase, "Edit my speakable hotlist", permits the user to edit the grammar by adding additional phrases that will cause the page to be retrieved by voice.

The speakable hotlist process is activated when the voice recognizer recognizes a hotlist translation from the hotlist grammar file and passes the translation to the hotlist process. The hotlist process looks up the associated URL. It passes the URL to the browser residing on host computer 11 (via wireless communication), so that the Web page may be retrieved and transmitted to the voice control unit 10 for display on display 10a.

The grammar files for speakable commands and the speakable hotlist are active at all times. This permits the user to speak the commands or hotlist links in any context. A speakable links process may also reside in memory 20e of voice control unit 20. Selected information in a Web page may provide links, for access to other web pages. Links are indicated as such by being underlined, highlighted, differently colored, outlined as in the case of pictures, or otherwise identified. Instead of using a mouse or other pointing device to select a link, the user of voice control unit 10 may speak a link from a page being display on display 10a.

Figure 4:
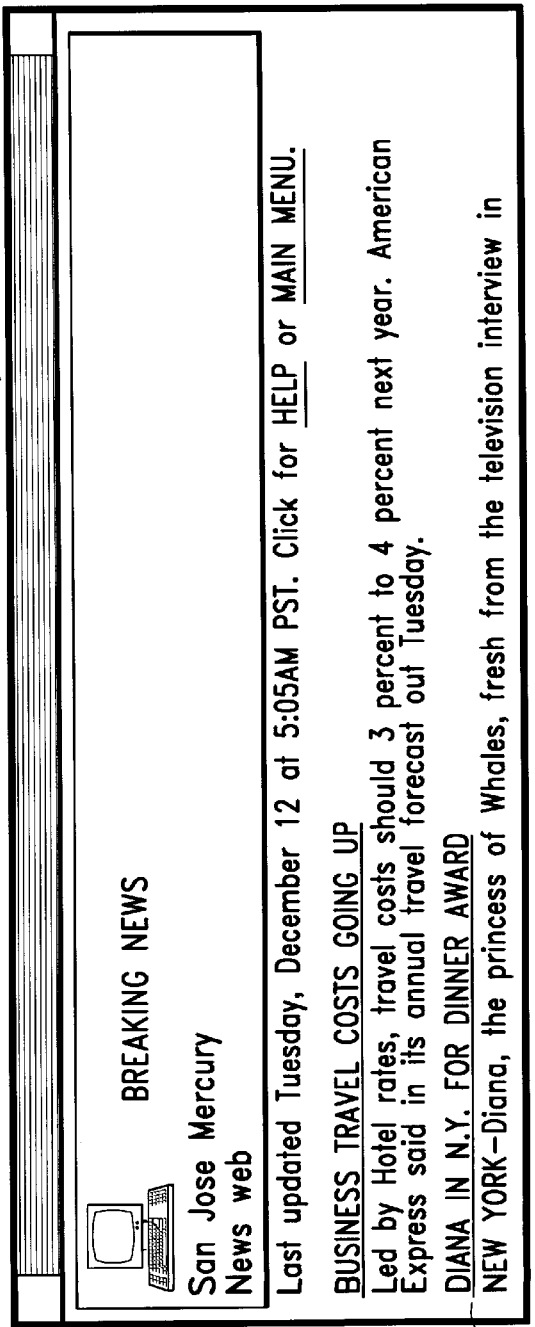
FIG. 4 illustrates a portion of a Web page and its speakable links.

FIG. 4 illustrates a portion of a Web page 40 and its links. For example, the second headline 41 is a link.

The grammar for speakable links includes the full phrase as well as variations. In addition to speaking the full phase, the speaker may say "Diana in N period Y period" (a literal variation), "Diana in NY", or "Diana in New York".

Making a link speakable first requires obtaining the link/URL pair from its Web page. Because a Web page in HTML (hypertext markup language) format can have any length, the number of candidate link/URL pairs that the recognizer searches may be limited to those that are visible on a current screen of display 20a. A command such as, "Scroll down", updates the candidate link/URL pairs. Once the link/URL pairs for a screen are obtained, a grammar is created for the all the links on the current screen. Next, tokens in the links are identified and grammars for the tokens are created. These grammars are added to the recognizer's grammar files. Correct tokenization is challenging because link formats can vary widely. Links can include numbers, acronyms, invented words, and novel uses of punctuation.

Other challenges for speakable links are the length of links, ambiguity of links in the same page, and graphics containing bit-mapped links. For long links, the speakable links process permits the user to stop speaking the words in a link any time after N words. For ambiguity, the process may either default to the first URL or it may offer a choice of URLs to the user. For bit-mapped links, the process uses an <ALT> tag to look for link information.

The grammars for speakable links may be dynamically created so that only the grammar for a current display is active and is updated when a new current display is generated. Dynamic grammar creation also reduces the amount of required memory 10f.

Figure 5:
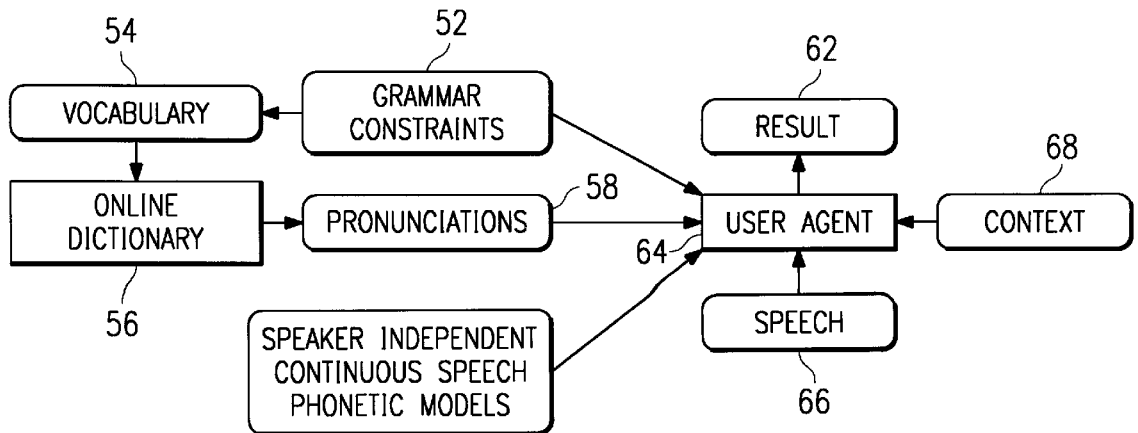
FIG. 5 illustrates a process of dynamically creating grammars for use by the voice recognizer of FIGS. 1 and 2.

FIG. 5 illustrates a suitable process of dynamically creating grammar files. This is the process implemented by the dynamic grammar generator of FIGS. 1 and 2. As explained above, dynamic grammar files are created from current Web pages so that speakable links may be recognized. U.S. patent U.S. Pat. No. 5,774,628, incorporated by reference above, further describes this method as applied to a voice-controlled host system 11, that is, voice control without a separate remote control device 10.

A display, such as the display 40 of FIG. 4, affects grammar constraints 52. The grammar constraints 52 are input into a vocabulary 54 and the user agent 64. In turn, the vocabulary 54 feeds the online dictionary 56, which inputs into the pronunciations module 58. The pronunciations module 58, as well as the Speaker Independent Continuous Speech Phonetic Models module 60, input into the User Agent 64. In addition, the Speech module 66 inputs the user's speech into the User Agent 64. In parallel, the Context module 68 gets inputs from the screen 40 and inputs into the User Agent 64.

An existing RGDAG (Regular Grammar Directed Acyclic Graph) may dynamically accommodate new syntax and vocabulary. Every time the screen 40 changes, the user agent 64 creates a grammar containing the currently visible underlined phrases (links). From this grammar, the user agent 64 tokenizes the phrases to create phrase grammars that can include, for example, optional letter spelling and deleted/optional punctuation. From the tokens, the user agent 64 creates phonetic pronunciation grammars using a combination of online dictionaries and a text-to-phoneme mapping. The voice recognition process then adds the grammars created. This involves several simple bookkeeping operations for the voice recognizer, including identifying which symbols denote "words" to output. Finally, global changes are implemented to incorporate the new/changed grammars. For this, the grammars are connected in an RGDAG relationship. In addition, the maximum depth for each symbol is computed. It is also determined whether the voice recognizer requires parse information by looking for ancestor symbols with output. Then the structure of the grammar for efficient parsing is identified.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A wireless voice-activated control system comprising:
   a remote processor-based host system;
   a voice recognition processor operable to perform a voice recognition process and a memory that stores said voice recognition process and grammar files; and
   a voice activated control unit for remotely controlling said remote processor-based host system comprising:
   a microphone operable to receive voice command input from a user, thereby providing an audio input signal; said microphone operably coupled to said voice recognition processor, said memory and said grammar files for voice recognition of said voice commands;
   an audio transmitter operable to wirelessly transmit data derived from said audio input signal to said host system to control said host system;
   a data receiver operable to wirelessly receive image data from said host system representing voice commanded display images; and
   a display operable to generate and display said voice commanded images represented by said image data.

2. The control unit of claim 1, wherein said microphone is switchable to an on or off state separately from said display.

3. The control unit of claim 1, wherein said microphone is a multi-element microphone array.

4. The system of claim 1, wherein said voice recognition process comprises linear predictive coding analysis, and wherein said transmitter is operable to transmit the results of said analysis.

5. The system of claim 1, wherein said grammar files are dynamically created, wherein said processor is further operable to perform a dynamic grammar generation process.

6. The system of claim 1, wherein said voice recognition processor comprises speech and pointing analysis and wherein said transmitter is operable to transmit the result of said analysis.

7. A wireless voice-activated control system for voice-control of a remote processor-based host system in data communication with a hypermedia resource to permit a user to browse a hypermedia network, comprising:

said remote processor-based host system including a web browser and in data communication with a hypermedia resource;

a voice recognition processor operable to perform a voice recognition process and a memory that stores said voice recognition process and grammar files; and a voice-activated control unit for remotely controlling said remote processor-based host system comprising:

a microphone operable to receive voice browser commands input from a user, thereby generating an audio input signal; said microphone operably coupled to said voice recognition processor, said memory and said grammar files for voice recognition of said voice commands;

an audio transmitter operable to wirelessly transmit data representing browser commands derived from said audio input signal to said remote processor-based host system to cause said host system to browse said hypermedia network and retrieve selected web page;

a data receiver operable to wirelessly receive image data representing a selected web page from said remote host system; and a display operable to generate and display web page images represented by said image data and retrieved from said hypermedia resource by said host system.

8. The system of claim 7, wherein said voice recognition processor, said memory, and said grammar files are in said control unit.

9. The system of claim 7, wherein said voice recognition processor comprises linear predictive coding analysis, and wherein said transmitter is operable to transmit the results of said analysis.

10. The system of claim 7, wherein said voice recognition processor comprises speech end pointing analysis, and wherein said transmitter is operable to transmit the results of said analysis.

11. The system of claim 7, wherein said grammar files are dynamically created, wherein said processor is further operable to perform a dynamic grammar generation process.

12. The system of claim 7, further comprising a processor operable to perform voice control processes and a memory that stores said voice control processes.

13. The system of claim 12, wherein said voice control processor comprise a speakable commands process such that said user may vocally direct the operations of said host system.

14. The system of claim 12, wherein said voice control processor comprise a speakable hotlist process such that said user may vocally request a particular one of said resources to be retrieved by said host system.

15. The of claim 12, wherein said voice control processes comprise a speakable links process such that said user may vocally request that a link on a current page being displayed on said display be retrieved by said host system.

16. The system of claim 7, further comprising a processor operable to perform dynamic grammar creation processes, and memory that stores said processes.

17. The system of claim 7, wherein said host system performs voice control processes.

18. The system of claim 7, wherein audio data from the microphone is sent to the host system which performs all processing.

* * * * *